United States Patent [19]

Takeuchi et al.

[11] Patent Number: 4,711,216

[45] Date of Patent: Dec. 8, 1987

[54] FUEL SUPPLY DEVICE FOR AN INTERNAL COMBUSTION ENGINE

[75] Inventors: Yasuhiro Takeuchi, Okazaki; Yasuyuki Sakakibara, Nishio; Toshihiko Igashira, Toyokawa; Hidetaka Nohira, Mishima, all of Japan

[73] Assignees: Nippon Soken, Inc., Nishio; Toyota Jidosha Kabushiki Kaisha, Toyota, both of Japan

[21] Appl. No.: 863,151

[22] Filed: May 14, 1986

[30] Foreign Application Priority Data

May 16, 1985 [JP] Japan ................................ 60-102742

[51] Int. Cl.⁴ ............................................. F02M 39/00
[52] U.S. Cl. .................................... 123/447; 123/496; 123/506; 123/446
[58] Field of Search ............... 123/447, 496, 506, 446, 123/458, 500, 501, 457

[56] References Cited

U.S. PATENT DOCUMENTS

| | | | |
|---|---|---|---|
| 3,810,453 | 5/1974 | Wolfe | 123/447 |
| 4,029,071 | 6/1977 | Saito | 123/447 |
| 4,409,939 | 10/1983 | Eheim | 123/447 |
| 4,469,069 | 9/1984 | Kuroyanagi et al. | |
| 4,572,136 | 2/1986 | Takeuchi et al. | 123/447 |

OTHER PUBLICATIONS

U.S. Patent Application Ser. No. 650719 filed Sep. 14, 1984.

Primary Examiner—Carl Stuart Miller
Attorney, Agent, or Firm—Cushman, Darby & Cushman

[57] ABSTRACT

A fuel supply device in which a regulator pressurizes fuel fed to a fuel injector to adjust the fuel to a predetermined pressure according to an engine condition. The regulator has a piston in a housing to form a control chamber and a high pressure chamber therein. The high pressure chamber is communicated with the fuel injector and a pump chamber of a high pressure pump discharging a highly pressurized fuel. The control chamber is connected to a pressure source generating a high pressure according to an engine condition. The piston moves in response to the pressure in the control chamber to pressurize the fuel in the high pressure chamber.

13 Claims, 10 Drawing Figures

FUEL SUPPLY DEVICE FOR AN INTERNAL COMBUSTION ENGINE

BACKGROUND OF THE INVENTION

1. Field of the Invention

The present invention relates to a fuel supply device supplying highly pressurized fuel to an internal combustion engine, especially a Diesel engine.

2. Description of the Related Art

A conventional fuel supply device has a high pressure pump discharging a highly pressurized fuel, a regulator maintaining the highly pressurized fuel at a constant value, and a fuel injector injecting the highly pressurized fuel maintained at the constant value into an internal combustion engine. The regulator holds the highly pressurized fuel, and has a relief valve to release a part of the fuel to a reservoir when pressure of the fuel exceeds the constant value. Such a fuel supply device construction is described in U.S. patent application Ser. No. 650,719 now U.S. Pat. No. 4,572,136.

It is desirable that the pressure of the fuel supplied to the fuel injector through the regulator be low when the engine is driven at a low speed and light load condition, and high when the engine is driven at a high speed and heavy load condition. In the above conventional device, however, the relief valve operates in such a manner that pressure of the fuel is maintained at a constant value. That is, the pressure of the fuel cannot be freely varied. Further, since the above conventional high pressure pump always discharges a maximum quantity of fuel to be supplied to the fuel injector, the drive force for the pump must have a relatively large capacity.

SUMMARY OF THE INVENTION

Therefore, an object of the present invention is to provide a fuel supply device by which the pressure of fuel supplied to a fuel injector is freely varied according to an engine condition.

Another object of the present invention is to provide a fuel supply device by which a drive force for the high pressure pump is reduced in comparison with a conventional device.

According to the present invention, there is provided a fuel supply device comprising a fuel tank reserving fuel, a high pressure pump pressurizing fuel sent from the fuel tank and discharging the highly pressurized fuel, a regulator having a high pressure chamber for holding the highly pressurized fuel discharged from the high pressure pump to maintain the fuel at a set pressure, controlling means to regulate a fuel pressure in the high pressure chamber and varying the fuel pressure according to an engine condition, and a fuel injector injecting the highly pressurized fuel maintained at the set pressure by the regulator to the internal combustion engine.

BRIEF DESCRIPTION OF THE DRAWINGS

The present invention may be more fully understood from the description of preferred embodiments of the invention set forth below, together with the accompanying drawings, in which;

FIGS. 5, 5A and 5B are flowcharts of a main program for fuel supply control;

FIGS. 7, 7A and 7B are flowcharts of a program for controlling a regulator; and

DESCRIPTION OF THE PREFERRED EMBODIMENTS

The present invention will now be described below with reference to the preferred embodiments thereof.

Figure 1:
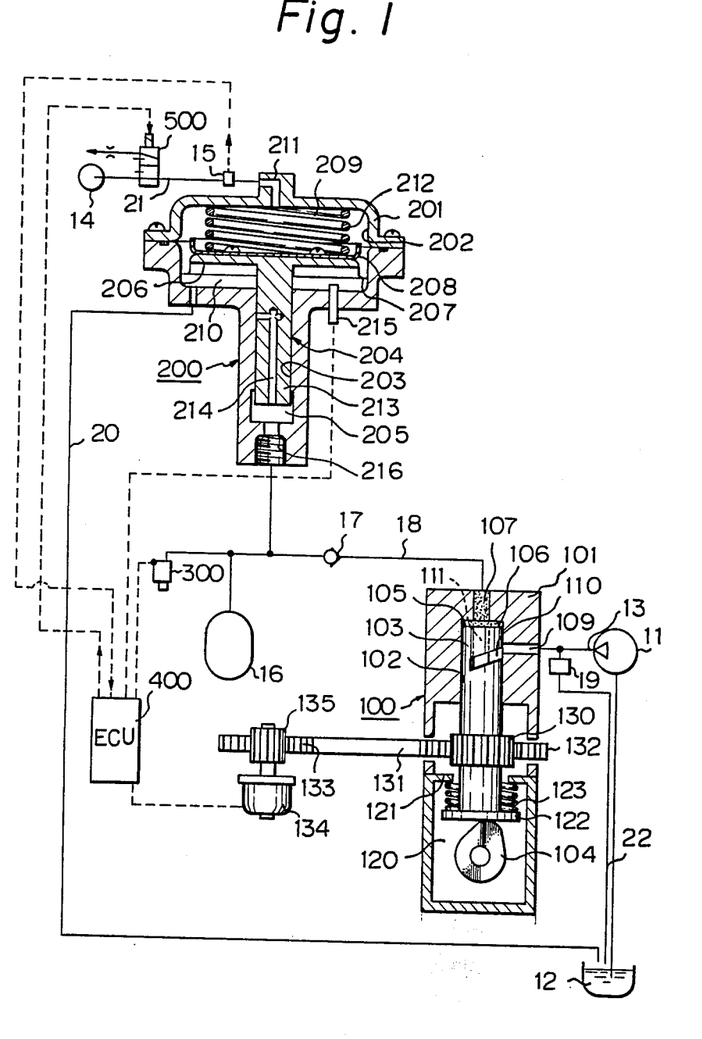
FIG. 1 is a sectional view of a first embodiment of the present invention.

FIG. 1 shows a whole construction of a first embodiment of the present invention. Highly pressurized fuel discharged from a high pressure pump 100 is further pressurized to a predetermined value by a regulator 200 and supplied to a fuel injector 300, which is controlled by an electronic control unit (ECU) 400 to inject the highly pressurized fuel to an internal combustion engine. The high pressure pump 100 is supplied with fuel reserved in a fuel tank 12 through a low pressure fuel line 13 by a feed pump 11, and pressurizes the fuel to be discharged therefrom. The regulator 200 further pressurizes the highly pressurized fuel discharged from the high pressure pump 100 to a predetermined value, by the action of a highly pressurized air transmitted from an air pump 14. The pressure of the highly pressurized air sent to the regulator 200 is controlled to a predetermined value through an air pressure control mechanism 500 and an air pressure sensor 15.

The high pressure pump 100 has a housing 101 having a cylinder bore 102, a plunger 103 slidably supported in the cylinder bore 102, and a cam 104 reciprocating the plunger 103. A spring 123 is provided between a projecting portion 121 formed on a inner surface of the housing 101 and a flange 122 formed at the lowest portion of the plunger 103 to urge the plunger 103 downward so that an under surface of the flange 122 is always in contact with the cam 104. In the drawing, the cylinder bore 102 is formed in an upper portion in the housing 101, and a pump chamber 106 is defined by the cylinder bore 102 and an upper surface 105 of the plunger 103. The pump chamber 106 is contracted and expanded by reciprocation of the plunger 103 generated by rotation of the cam 104. Highly pressurized fuel in the pump chamber 106 is transmitted to a reservoir 16 and the fuel injector 300 through an outlet port 107 formed in an upper wall of the housing 101 and a high pressure fuel line 18. Note that a check valve 17 is provided in the high pressure fuel line 18 to prevent a backflow of the fuel.

An inlet port 109 perforated in a side wall of the housing 101 connects the low pressure fuel line 13 to the cylinder bore 102. A release groove 110 is formed on an outer surface of the plunger 103, the release groove 110 inclining to the axis of the plunger 103. A passage 111 connecting the release groove 110 to the pump chamber 106 is formed in the plunger 103.

Thus, when the plunger 103 is positioned at a lowermost position, the upper surface 105 of the plunger 103 is situated below the inlet port 109 so that fuel transmitted from the feed pump 11 is lead into the pump chamber 106 through the low pressure fuel line 13 and the inlet port 109. This fuel transmitted from the feed pump 11 is always maintained at a constant pressure by a regulator 19 provided in a drain line 22 connecting the low pressure fuel line 13 to the fuel tank 12. If the plunger 103 is moved upward by operation of the cam 104 so that the inlet port 109 is closed by an outer surface of the plunger 103, pressure is built-up in the fuel in the pump chamber 106. If the plunger 103 moves further upward so that the release groove 110 communicates with the inlet port 109, the pressurized fuel in the pump chamber 106 is released into the low pressure fuel line 13 through the passage 111, the release groove 110, and the inlet port 109, so that pressurizing of the fuel in the pump chamber 106 is finished. Note that, since the release groove 110 formed on the outer surface of the plunger 103 slants to the axis thereof, as described above, the stroke of the plunger in which the release groove 110 is communicated with the inlet port 109 is varied by rotational displacement of the plunger 103, so that the quantity of fuel discharged from the high pressure pump 100 is varied.

For control of the quantity of fuel to be discharged, a pinion gear 130 is fitted on a portion of the plunger 103 that projects into a chamber 120, and the pinion gear 130 meshes a rack 132 formed on a rod 131 extended in a direction perpendicular to the plunger 103. Thus, if the rack 132 is displaced along the longitudinal direction thereof, the plunger 103 is rotated by the pinion gear 130. The pinion gear 130 is supported in such a manner that it cannot move axially but only rotate relative to the housing 101. The plunger 103 is meshed with the pinion gear 130 through, for example, a spline, so that the plunger 103 cannot rotate relative to the pinion gear 130 but only move axially in relation to the pinion gear 130. The rod 131 is projected from the chamber 120 to the outside of the housing 101, and a rack 133 formed on the opposite end portion of the rack 132 is meshed with a pinion gear 135 mounted on an output shaft of a pulse motor 134, which is fixed to a not shown base.

Accordingly, when the pulse motor 134 rotates, the rod 131 is moved to the right or left as viewed in the drawing, so that the plunger 103 rotates about the axis thereof. In this embodiment, when the rod 131 moves to the right in the drawing, the plunger 103 rotates counterclockwise when observed from underneath, so that during a stroke of the plunger 103 in which the plunger 103 moves upward, communication between the release groove 110 and the inlet port 109 is reduced, and thus the quantity of fuel discharged is decreased. Conversely, when the rod 131 moves to the left, the plunger 103 rotates clockwise when observed from underneath, so that the quantity of fuel discharged is increased. For this control of the quantity of fuel to be discharged, the pulse motor 134 is controlled by the ECU 400.

The regulator 200 is provided with an air pressure through the air pressure control mechanism 500, to further pressurize the highly pressurized fuel in the high pressure line 18 to a predetermined pressure. A housing 201 is formed with a large diameter bore 202 and a small diameter bore 203. A small diameter portion 213 of a piston 204 is slidably supported in the small diameter bore 203 to define a high pressure chamber 205 in a lower portion of the small diameter bore 203. The high pressure chamber 203 communicates with the high pressure fuel line 18 through a port 216. The piston 204 projects in the large diameter bore 202, the projecting portion thereof being formed by a flange 206. A diaphragm 207 is provided in such a manner that an outer peripheral portion thereof is fixed to an inner wall of the large diameter bore 202 and an inner peripheral portion thereof is fixed to the flange 206 by a dish-shaped retainer 208. Thus, the large diameter bore 202 is divided into a control chamber 209 and a low pressure chamber 210 by the diaphragm 207. In the drawing, the control chamber 209 is situated in the upper portion of the large diameter bore 202 and highly pressurized air from the air pressure control mechanism 500 is fed to the control chamber 209 through a port 211. A spring 212 provided in the control chamber 209 constantly urges the piston 204 downward. The low pressure chamber 210 is communicated with the tank 12 through a drain line 20 so that fuel in the low pressure chamber 210 can be returned to the tank 12.

The small diameter portion 213 of the piston 204 is formed with a relief passage 214. One end of the passage 214 is open to the high pressure chamber 205 and the other end of the passage 214 is open in a side surface of the small diameter portion 213. When the piston 204 is in the downstroke position, the other end of the passage 214 is closed by the small diameter bore 203. Conversely, when the piston 204 is in the upstroke position, the other end of the passage 214 is open to the low pressure chamber 210 and thus the high pressure chamber 205 is communicated with the tank 12 through the passage 214, the low pressure chamber 210, and the drain line 20.

A position sensor 215 is mounted in the housing 201 in such a way that it protrudes into the low pressure chamber 210 and faces the flange 206 of the piston 204, to thereby sense the position of the piston 204. The position sensor 215 is an Eddy-current type noncontact gap-sensor previously known, and the output signal of the sensor 215 is input to the ECU 400.

In this embodiment, the sectional area ratio of the large diameter bore 201 and the small diameter bore 202 is 100:1, so that pressure in the high pressure chamber 205 is raised to 100 times the pressure of the control chamber 209. Therefore, if the gauge pressure of the control chamber 209 is varied between 1 and 10 atmospheres, the gauge pressure of the high pressure chamber 205 is varied between 100 and 1000 atmospheres. The pressure of the control chamber 209 is varied by the air pressure control mechanism 500.

Figure 2:
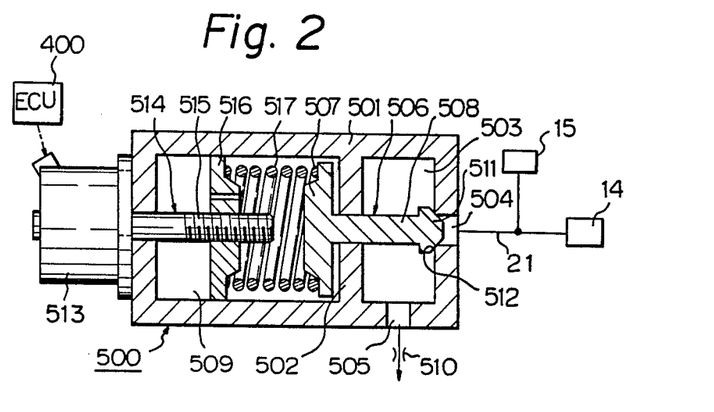
FIG. 2 is a sectional view of an air pressure control mechanism.

FIG. 2 shows the construction of the air pressure control mechanism 500. The inside of a casing 501 is formed with a pressure chamber 503 and a closed chamber 509 by a partition wall 502. The pressure chamber 503 is communicated with a line 21 through an inlet port 504, and is constantly communicated with the atmosphere through an atmospheric port 505 and an orifice 510. A valve 506 is composed of a flange 507 and a open-close portion 508. The flange 507 is situated in the closed chamber 509, and the open-close portion 508 projects in the pressure chamber 503 so that a tip portion 511 of the open-close portion 508 is in tight contact with a seat portion 512 formed on an inside surface of the inlet port 504, to close the inlet port 504.

A pulse motor 513 is attached on an outside of the 501, an output shaft 514 of the motor 513 being inserted in the closed chamber 509. The output shaft 514 is formed with a thread 515 on which a retainer 516 is threadingly fitted. The retainer 516 is engaged with an inner wall of the closed chamber 509 so that it can move along the output shaft 514, but cannot rotate about the output shaft 514. A spring 517 is provided between the retainer 516 and the flange 507 of the valve 506. The retainer 516 is displaced by rotation of the output shaft 514, and accordingly, the spring 517 is compressed or released to vary the spring force against the flange 507 and thus vary a pressure needed for opening the valve 506. In the operation of the valve 506, when the pressure at the inlet port 504 is low, the valve 506 is pressed against the seat portion 512 by the spring 517 so that the inlet port 504 is closed. If the pressure of the inlet port 504 increases and becomes larger than the spring force of the spring 517, the valve 506 moves to the left against the force of the spring 517 to open the inlet port 504. Highly pressurized air in the line 21 is then released to the atmosphere through atmospheric port 505 and the orifice 510, and thus the pressure at the inlet port 504 is decreased so that the valve 506 closes the inlet port 504. This operation of the valve 506 is repeated so that pressure in the line 21 is maintained at a constant value.

The pressure for opening the valve 506 is varied by driving the pulse motor 513 to vary a position of the retainer 516, and thus adjust the air pressure in the line 21. The set air pressure in the line 21 can be varied between 1 and 10 atmospheres, as described below, and the pulse motor 513 controlled by the ECU 400 changes the set air pressure. For this control, an air pressure sensor 15 is provided in the line 21, and the ECU 400 drives the pulse motor 513 in accordance with signals output by the air pressure sensor 15.

Thus, the regulator 200 is supplied with highly pressurized air at a predetermined value through the air pressure control mechanism 500, to pressurize fuel in the high pressure line 18 to a pressure 100 times that of the air pressure, and supply the pressurized fuel to the fuel injector 300.

Figure 3:
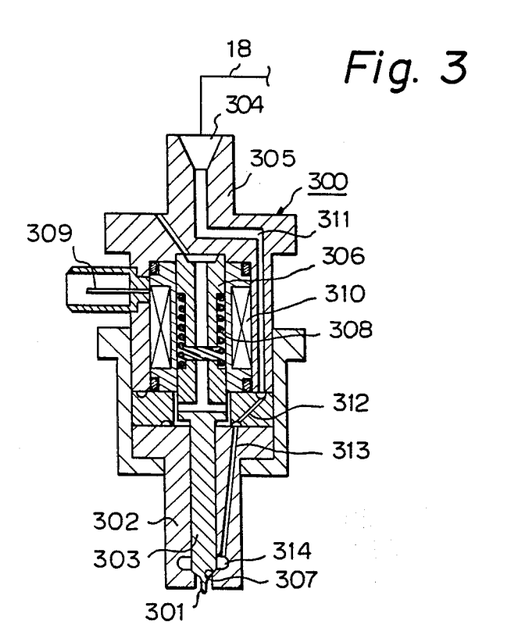
FIG. 3 is a sectional view of a fuel injector.

FIG. 3 shows a construction of the fuel injector 300. The fuel injector 300 comprises a nozzle body 302 formed with an injecting port 301, a nozzle needle 303 slidably inserted in the nozzle body 302, a core 306 fixed in a nozzle holder 305, having a fuel inlet port 304, and facing an upper surface of the nozzle needle 303, and a spring 308 provided between the core 306 and the nozzle needle 303 to press the nozzle needle 303 against a seat surface 307 formed near the injecting port 301, to close the fuel injector 300. A coil 310 connected to a terminal 309 is provided around the core 306. When the coil 310 is supplied with an electric current through the terminal 309, a magnetic force is generated in the coil 310, so that the nozzle needle 303 is drawn toward the core 306 against the spring 308, to separate from the seat surface 307 and open the injecting port 301.

The fuel inlet port 304 of the nozzle holder 305 is connected to the high pressure line 18, and communicates with a fuel reservoir 314 formed near the seat surface 307 through passages 311, 312, and 313. When the nozzle needle 303 separates from the seat surface 307, fuel is injected from the fuel port 301.

When the electric current to the coil 310 is cut off, the nozzle needle 303 is pressed against the seat surface 307 again by the force of the spring 308, and the fuel injection is finished.

The fuel injector 300 is provided at each engine cylinder and is opened or closed by control from the ECU 400. When a crank angle signal, TDC (top dead center) signal, cylinder identification signal, accelerator pedal angle signal, etc., are input to the ECU 400, the ECU 400 adjusts the fuel injection amount and timing for each engine cylinder according to the input signals and outputs signals to the terminals 309 of each fuel injector 300.

Figure 4:
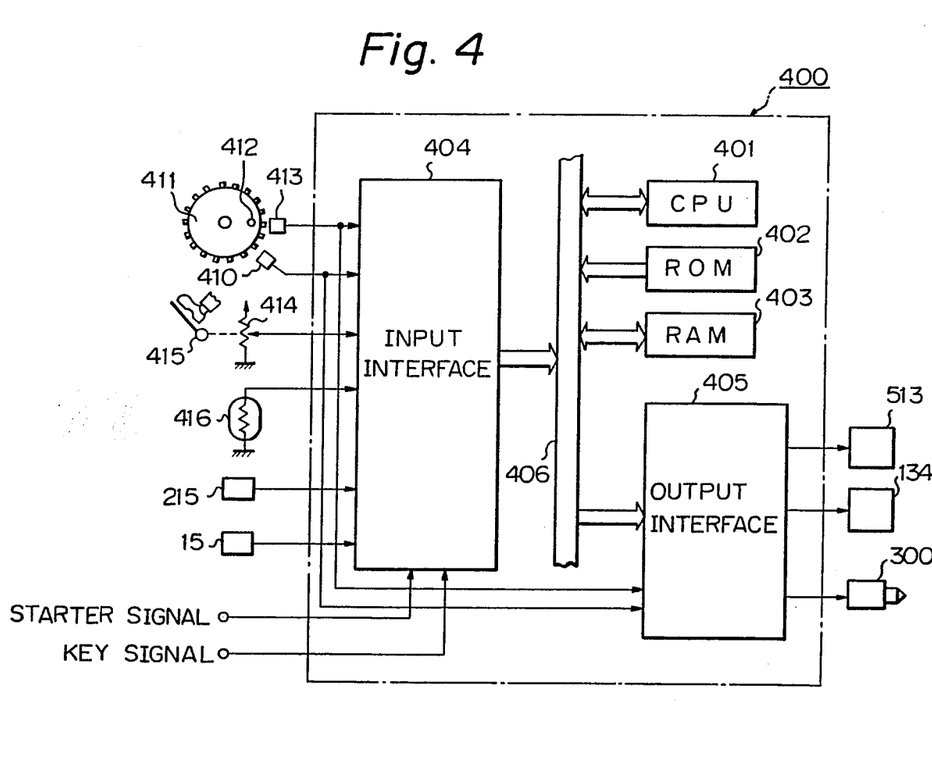
FIG. 4 is a schematic view of an electronic control unit.

FIG. 4 is a block diagram showing a construction of the ECU 400. The ECU 400 comprises a central processing unit (CPU) 401 for calculating and control, a read only memory (ROM) 402 for storing data and programs, a random access memory (RAM) 403 for operation of the CPU 401 and for storing data, an input interface 404 for dealing with signals input from outside, and an output interface 405 for loading data obtained by the CPU 401 and outputting the data to outside. These elements are connected to each other by a bus line 406.

The following signals are input to the input interface 404. An angle sensor 410 outputs a pulse signal at each 1° CA (crank angle) by sensing each of 720 projections formed on an outer periphery of a signal plate 411 fixed to a cam shaft (not shown) of an engine. The signal plate 411 has a projection 412 formed thereon for detecting a base position of the engine, and a base position sensor 413 outputs a pulse signal at each 720° C. CA by sensing the projection 412. The pulse signals output by the angle sensor 410 and the base position sensor 413 are input to the input interface 404 and sent to the bus line 406 as data showing the number of engine revolutions. An accelerator pedal angle sensor 414 comprises a potentiometer connected to an accelerator pedal 415. An electric voltage signal showing the accelerator pedal angle is input to the input interface 404 and A/D converted before being sent to the bus line 406. A water temperature sensor 416 is attached to a water jacket (not shown) of the engine to sense a temperature of cooling water therein, and the water temperature is converted to an electrical resistance by, for example, a thermister, and outputs the electrical resistance signal. This output signal is converted to a voltage, and A/D converted before being sent to the bus line 406. The position sensor 215 outputs a signal showing a position of the piston 204 of the air pressure control mechanism 200, and this output signal is A/D converted in the input interface 404 before being sent to the bus line 406. The air pressure sensor 15 senses a pressure in the control chamber 209 of the air pressure control mechanism 200 and outputs a signal which is A/D converted in the input interface 404 before being sent to the bus line 406. Also, an engine starter signal and a key signal showing an engine driving condition are input to the input interface 404.

The output interface 405 outputs the following command signals. A first command signal is output to control the pulse motor 513 of the air pressure control mechanism 500 so that the pulse motor 513 rotates normally or in reverse, or stops, to vary the pressure for opening the valve 506. A second command signal drives the pulse motor 134 for displacing the rod 131 of the high pressure pump 100, that is, the pulse motor 134 rotates normally or in reverse, or stops, to vary a fuel amount discharged by the high pressure pump 100. A third command signal controls the fuel injector 300, and drives the fuel injector 300 according to the fuel injection period and timing set by the CPU 401.

Figure 5A:
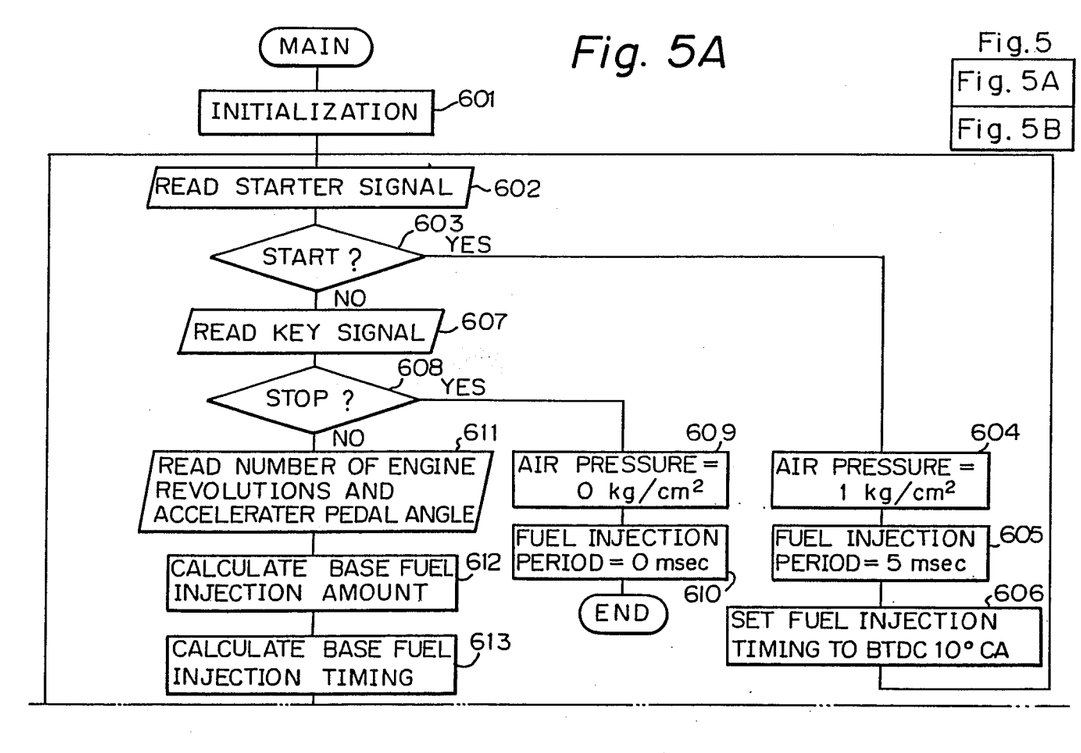
Figure 5B:
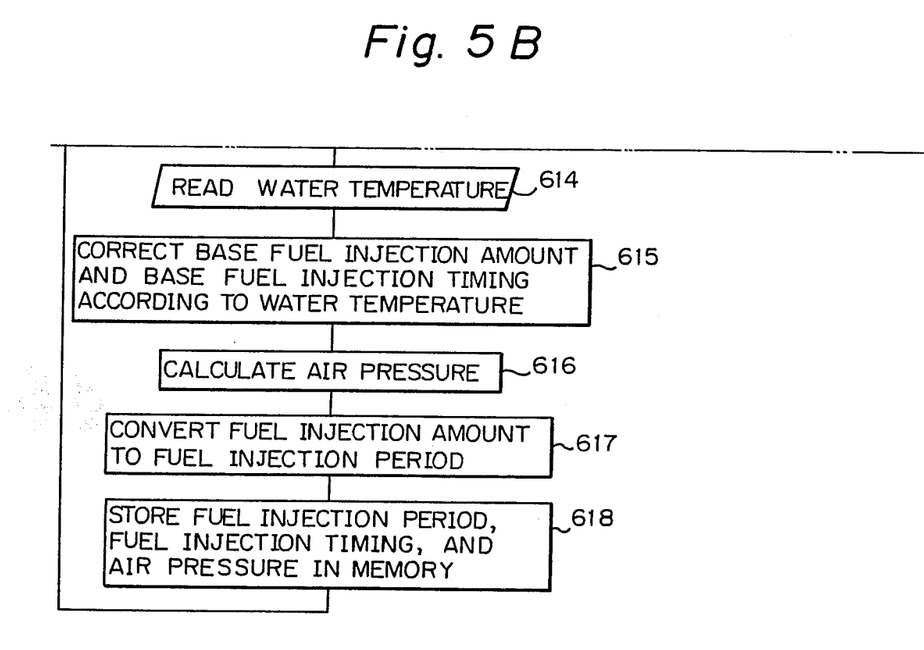
Figure 6:
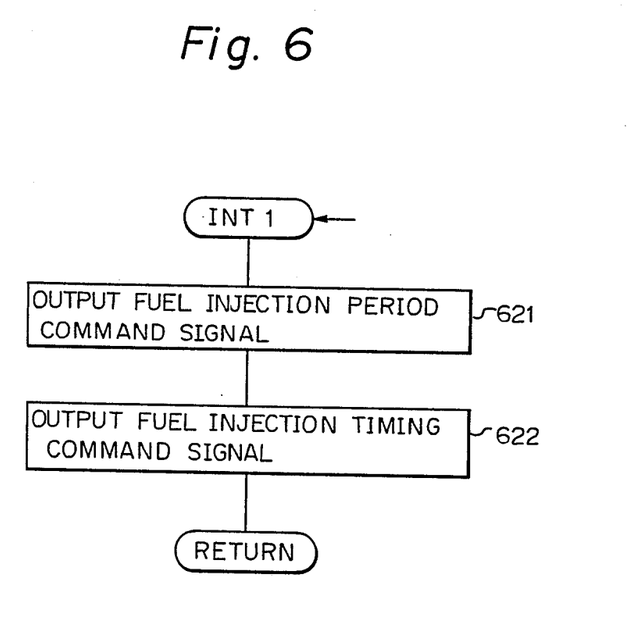
FIG. 6 is a flowchart of a program for fuel injection.
Figure 7A:
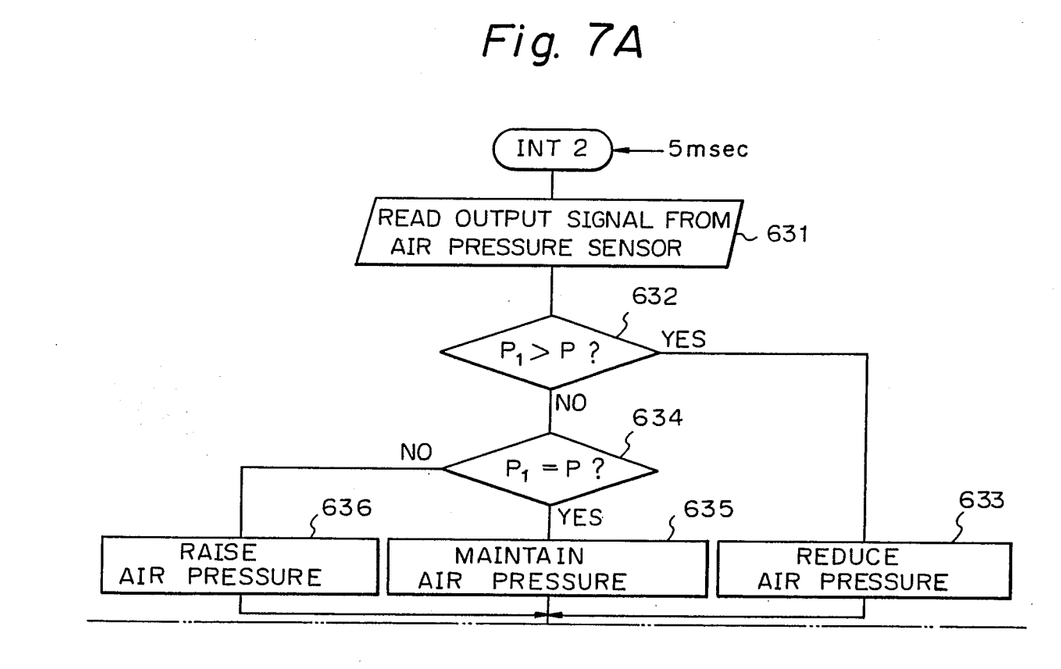
Figure 7B:
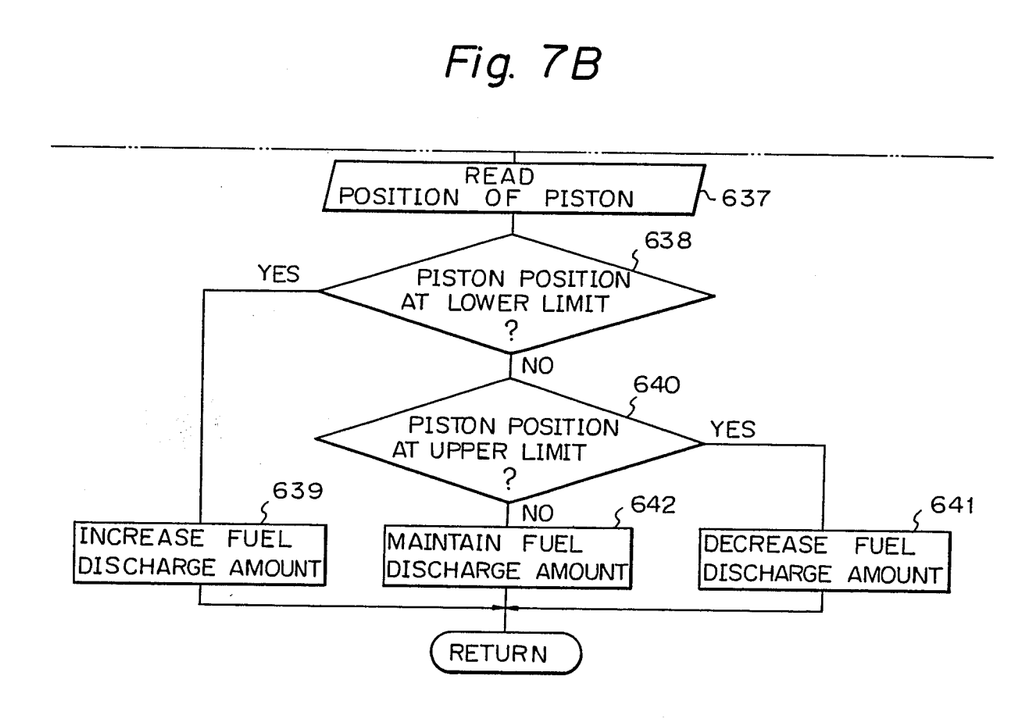

FIGS. 5, 6, and 7 are flow charts showing the control operations carried out by the ECU 400.

FIG. 5 shows a MAIN routine. In step 601, initialization is carried out, and a starter signal is read in step 602. In step 603, it is determined whether or not the starter signal is ON, i.e., whether or not the engine is being started. If the engine is being started, the routine goes to step 604. That is, the routine of steps 604, 605, and 606 is carried out as follows when the engine is started. In step 604, an air pressure in the control chamber 209 of the regulator 200 is set to 1 kg/cm$^2$, i.e., a command data for which fuel pressure is set to 100 kg/cm$^2$ is stored in the RAM 403. In step 605, a fuel injection period τ is set to 5 msec, and in step 606, a fuel injection timing is set to BTDC 10° CA. The process then returns to step 602.

If the ECU 400 judges the engine is not being started in step 603, the process is moved to step 607 and a key signal is read. If this key signal is not ON, then in step 608, the ECU 400 judges that the engine will stop, and steps 609 and 610 are carried out. That is, in step 609, the air pressure in the control chamber 209 of the regulator 200 is set to 0 kg/cm², i.e., the fuel pressure is set to atmospheric pressure, and in step 610, the fuel injection period τ is set to 0 msec, so that fuel injection is halted to stop the engine.

In step 608, if the key signal is ON the ECU 400 judges that the engine is being driven, and thus the processes following step 611 are carried out. In step 611, the number of revolutions of the engine and the accelerator pedal angle are read. In step 612, reference is made to a map stored in the ROM 402, and accordingly, a basic fuel injection amount is calculated from the number of revolutions of the engine and the accelerator pedal angle. Similarly, in step 613, reference is made to the map and a basic fuel injection timing is calculated. Then, in step 614, the cooling water temperature is read. In step 615, the basic fuel injection amount and timing calculated in steps 612 and 613 are corrected according to the cooling water temperature, and the optimum fuel injection amount and timing are calculated. In step 616, a set value of the air pressure in the control chamber 209 of the regulator 200, that is, a set value of the fuel pressure, is calculated. The fuel pressure is closely related to the fuel injection period, namely, the higher the number of engine revolutions, the quicker must the fuel injection be ended. Thus, the air pressure control of the fuel pressure is a function of the number of engine revolutions, that is, a map in the ROM 402, in which a relationship between the number of engine revolutions and air pressure is stored, is referred to and a set value of the air pressure corresponding to the number of engine revolutions is calculated. Then, in step 617, the fuel injection amount calculated in step 615 is converted to a fuel injection period. This is because, in practice, the fuel injection amount is controlled by a valve opening period of the fuel injector 300. Finally, the fuel injection period, the fuel injection timing, and the air pressure obtained by the above steps are stored in the RAM 043, and the process is returned to step 602.

The INT 1 routine shown in FIG. 6 carries out the output operation of the fuel injection period and timing commands to the fuel injector 300. This INT 1 routine is started by a base signal obtained by the base position sensor 413. That is, after interruption of this base signal, the fuel injection period data stored in RAM 403 is read and output to the output interface 405 in step 621. Then, in step 622, the fuel injection timing data stored in the RAM 403 is read and output to the output interface 405 in step 622. The output interface 405 then outputs a drive signal for the fuel injector 300.

The INT 2 routine shown in FIG. 7 controls the adjustment of an air pressure in the regulator 200 and a discharge amount from the high pressure pump 100, based on a position of the piston 204. The INT 2 routine is started by a timer interruption at every 5 msec. That is, after the interruption, in step 631, an output data P₁ from the air pressure sensor 15 is read. Then, in step 632, it is determined whether or not the output data P₁ is larger than the set air pressure value P stored in the RAM 403 in step 618 of the MAIN routine shown in FIG. 5. If the output data P₁ is larger than the set value P, the process is moved to step 633, and then the pulse motor 513 of the air pressure control mechanism 500 is driven to reduce the air pressure in the control chamber 209. Conversely, in step 632, if the output data P₁ is not larger than the set value P, the process is moved to step 634, where it is determined whether or not the output data P₁ is equal to the set value P. If the output data P₁ is equal to the set value P, the process moves to step 635, and the pulse motor 513 is controlled to maintain the air pressure in the control chamber 209. If the output data P₁ is not equal to the set value P, namely, if the output data P₁ is lower than the set value P, the routine goes to step 636 and the pulse motor 513 is driven to raise the air pressure in the control chamber 209.

After steps 633, 635, and 636, the routine goes to step 637 and the signal output by the position sensor 215 sensing a position of the piston 204 of the regulator 200 is read. In step 638, it is determined whether or not the position of the piston 204 is located at a lower position of the lower limit. If the piston 204 is located lower than the lower limit, the routine goes to step 639 and the pulse motor 134 of the high pressure pump 100 is driven to increase the discharge amount from the high pressure pump 100, so that a larger quantity of fuel is supplied to the high pressure chamber 205 of the regulator 200. If it is determined that the position of the piston 204 is not located lower than the lower limit, the routine goes to step 640 to determine whether or not the position of the piston 204 is located higher than the higher limit. If the piston 204 is located higher than the higher limit, the routine goes to step 641 and the pulse motor 134 of the high pressure pump 100 is driven to decrease the discharge amount from the high pressure pump 100, and thus decrease the fuel amount in the high pressure chamber 205 of the regulator 200. If it is determined that the position of the piston 204 is not higher than the higher limit, in step 640, the piston 204 is located between the lower limit and the high limit, and accordingly, in step 642, the pulse motor 134 is not driven, to maintain the discharge amount from the high pressure pump 100. The control of the pulse motor 134 in steps 639, 641, and 642 is carried out through the output interface 405.

Operation of the device according to an embodiment of the present invention will be described with reference to FIG. 1.

In a steady engine driving condition, the air pressure control mechanism 500 maintains a constant pressure, and thus an air pressure in the control chamber 209 of the regulator 200 is maintained at a constant value. Therefore, a pressure in the high pressure chamber 205 is also maintained at a constant value, so that the reservoir 16 and the fuel injector 300 are maintained at a constant pressure. As mentioned before, the fuel injector 300 injects fuel according to a command from the ECU 400, and the high pressure pump 100 discharges a constant amount of fuel in accordance with a position of the rod 131.

If the fuel injection amount discharged from the fuel injector 300 becomes more than the amount of fuel discharged from the high pressure pump 100, the piston 204 in the regulator 200 gradually descends to a low position, since the amount of fuel in the high pressure chamber 205 of the regulator 200 is decreased. Accordingly, the position sensor 215 senses that the piston 204 is out of a predetermined position and sends a signal to the ECU 400. The ECU 400 then drives the pulse motor 134 to move the rod 131 to the left, and thus the amount of fuel discharged from the high pressure pump 100 is increased, so that the amount of fuel in the high pressure chamber 205 is increased and the piston 204 returned to the high position.

Conversely, if the fuel injection amount discharged from the fuel injector 300 is less than the amount of fuel discharged from the high pressure pump 100, the amount of fuel in the high pressure chamber 205 is increased, and the piston 204 is pushed to a higher position. The position sensor 215 senses this position of the piston 204, and thus the ECU 400 drives the pulse motor 134 to decrease the amount of fuel discharged from the high pressure pump 100.

As described above, the amount of fuel discharged from the high pressure pump 100 becomes nearly equal to the fuel consumption amount at the fuel injector 300, therefore, the output of the high pressure pump 100 becomes the lowest value. In a transit condition, preferably the pressure in the fuel supplied to the fuel injector 300 is varied according to an engine condition, and therefore, the fuel injection amount is constantly varied.

The ECU 400 determines a proper fuel injection period, fuel injection amount, and fuel supply pressure, according to the number of engine revolutions, engine load, and water temperature. For example, when the engine is accelerated from a low-speed and light-load condition to a high-speed and heavy-load condition, the ECU 400 controls the fuel injection operation in such a manner that the fuel injection amount is increased and the fuel supply pressure is raised.

To increase and decrease a fuel injection amount, the period for which an electric current is applied to the fuel injector 300 is increased and decreased. The increase and decrease of the fuel supply pressure is controlled by driving the pulse motor 513 of the air pressure control mechanism 500 to vary a pressure in the control chamber 209 of the regulator 200.

Assuming that the engine condition is varied from a low-speed and light-load condition to a high-speed and heavy-load condition. Since the amount of fuel discharged from the high pressure pump 100 is small in a low-speed and light-load condition, if the engine condition is varied to a high-speed and heavy-load condition, the fuel injection amount from the fuel injector 300 must be increased, and thus the piston 204 of the regulator 200 moves downward to the lower position. Since a pressure in the control chamber 205 is raised, the piston 204 pressurizes fuel in the high pressure chamber 205, and the piston 204 is moved further downward by the expansion of the fuel in the high pressure chamber 205, reservoir 16, and high pressure line 18. The position sensor 215 senses the displacement of the piston 204, and thus the ECU 400 decreases the amount of fuel discharged from the high pressure pump 100 to return the piston 204 to the higher position.

Conversely, if the engine condition is varied from a high-speed and heavy-load condition to a low-speed and light-load condition, the piston 204 of the regulator 200 is moved upward due to the excess amount of fuel discharged from the high pressure pump 100 and the resistance of highly pressurized fuel in the line 18. When the passage 214 in the piston 204 communicates with the low pressure chamber 210, the excess fuel is released to the tank 12. Also, the position sensor 215 senses the displacement of the piston 204, and thus the ECU 400 decreases the amount of fuel discharged from the high pressure pump 100.

After the engine is stopped, the set pressure at the air pressure control mechanism 500 is set to about 0, that is, the line 21 is opened to the atmosphere, and that the piston 204 is moved upward to decrease the pressure in the high pressure chamber 205 and the high pressure fuel line 18, whereby the fuel is prevented from leaking outside. At this time, the piston 204 is stopped at the higher position by the resistance of the fuel.

When the engine is started again, the air pump 14 is driven before the starting, so that an air pressure is generated in the control chamber 209 to pressurize the high pressure chamber 205. On starting, fuel must be at a pressure of 100 atmospheres, therefore the high pressure chamber 205 must be pressurized at 1 cc if the volume of the reservoir 16 is 100 cc. That is, if the diameter of the piston 204 is 8 mm, the piston 204 must be displaced by 20 mm.

As described above, according to this embodiment, the output of the high pressure pump 100 becomes equal to a value corresponding to the output of the fuel injector 300, to be a necessary minimum value. That is, inefficient operation of the high pressure pump 100 is avoided and heat generation in the fuel is prevented, and thus, durability of the pump 100 is improved and noise is decreased. Further a pressure fluctuation of highly pressurized fuel is prevented.

Further, according to this embodiment, a fuel supply pressure to the fuel injector 300 can be varied. In the fuel supply device, if the fuel supply pressure is maintained at a constant value, a fuel injection is carried out at a constant injection rate regardless of the engine condition. Therefore, to maintain a constant fuel injection amount regardless of the engine condition, a fuel injection period must be made constant. That is, in a high-speed condition, the fuel injection period is based on a narrow crank angle, and as a result, the engine noise is increased. Therefore, the fuel injection rate must be low in a low-speed condition and high in a high-speed condition. This condition is attained by this embodiment.

Further, according to this embodiment, the fuel supply device can operate as an auxiliary pump when the engine is started. That is, the fuel supply device of this embodiment can raise the fuel supply pressure before the engine is started and thus eliminate the need for an auxiliary pump used in a conventional engine.

Still further, the fuel supply device of this embodiment operates as a device for reducing pressure in a fuel supply system when the engine is stopped. That is, according to this embodiment, the fuel pressure can be reduced, and fuel leakage prevented.

Figure 8:
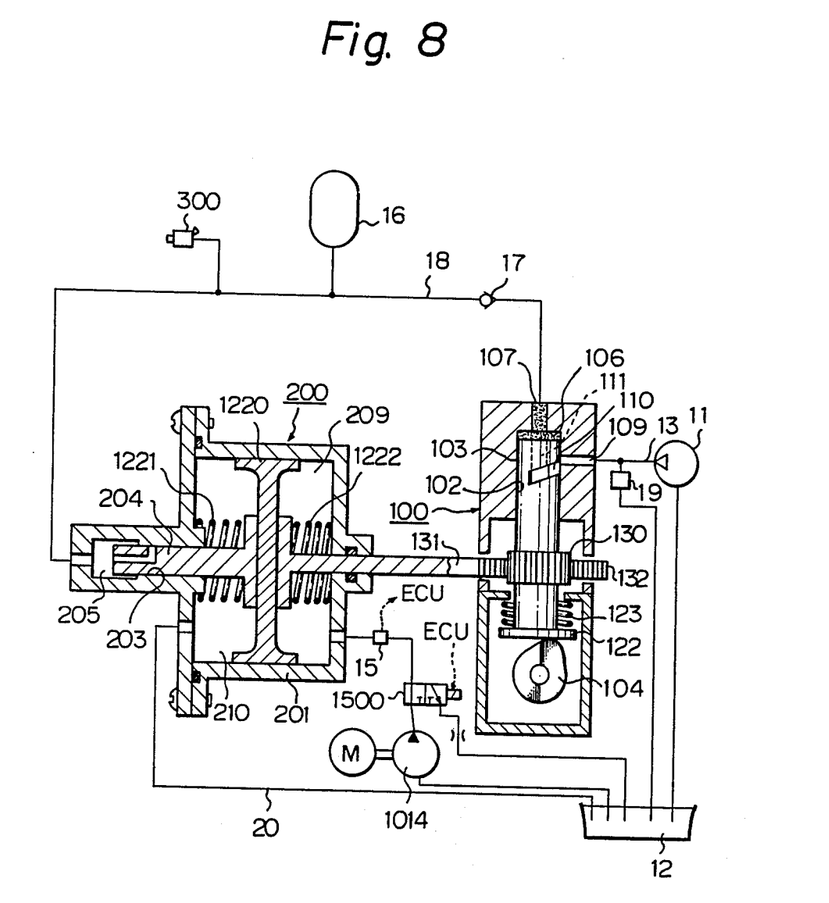
FIG. 8 is a sectional view of a second embodiment of the present invention.

FIG. 8 shows a second embodiment of the present invention. In this second embodiment, different from the first embodiment, an electric fuel feed pump 1014 is provided instead of the air pump 14, and supplies fuel to a control chamber 209 of a regulator 200 to pressurize fuel in a high pressure chamber 205. This regulator 200 is not provided with a diaphragm, and the control chamber 209 and a low pressure chamber 210 are defined by a plate member 1220 slidably housed in the housing 201. A piston 204 is biased by a spring 1221 so that the piston 204 is always in contact with one surface of the plate member 1220, and a rod 131 of a high pressure pump 100 is biased by a spring 1222 so that the rod 131 is always in contact with the other surface of the plate member 1220. That is, movement of the plate member 1220 is directly transmitted to the rod 131, so that a plunger 103 of the high pressure pump 100 is rotated. Thus, in this embodiment, a pulse motor for moving the rod 131 is not provided, and a position sensor is not provided to the regulator 200.

As this second embodiment is constructed as described above, if the amount of fuel in the high pressure chamber 205 of the regulator 200 is decreased, so that the piston 204 and the plate member 1220 are displaced to the left in the drawing, the rod 131 moves to the left to increase the amount of fuel discharged by the high pressure pump 100. Conversely, if the amount of fuel in the high pressure chamber 205 is increased so that the piston 204 and the plate member 1220 are displaced to the right, the rod 131 is moved to the right to decrease the amount of fuel discharged from the high pressure pump 100. Operation of the electric fuel feed pump 1014 and the fuel pressure control mechanism 1500 are the same as for the air pump 14 and the air pressure control mechanism 500 of the first embodiment.

Note that, in this second embodiment, a feed pump 11 supplying fuel to the high pressure pump 100 and the regulator 19 may be omitted, and the fuel feed pump 1014 can supply the fuel to the high pressure pump 100.

Further, in the first and second embodiments, there is no restriction of the number of engine cylinders to which this device may be applied, therefore, the number of the fuel injectors 300 may correspond to the number of engine cylinders, and each fuel injector 300 can be driven independently of the others by the ECU 400. It is not necessary that the number of pump chambers 106 of the high pressure pump 100 coincide with the number of engine cylinders. For example, if plural pump chambers 106 are provided, fuel discharged from the each pump chamber 106 will converge at a downstream portion of the check valve 17. Also, although in these embodiments the high pressure pump 100 is driven by the engine, it is not necessary for the pump 100 to be driven in synchronization with the engine.

Further, the regulator 200 need not be used for further pressurizing the fuel but can be used to depressurize the fuel to a constant value.

While embodiments of the present invention have been described herein with reference to the attached drawings, many modifications and changes may be made by those skilled in this art without departing from the scope of the invention.

We claim:

1. A fuel supply device for a diesel engine comprising:
   first sensing means for sensing an accelerator position of said diesel engine;
   second sensing means for sensing a rotational speed of said diesel engine;
   pump means for pressurizing fuel to a high pressure and discharging the highly pressurized fuel;
   regulator means for regulating the pressure of said highly pressurized fuel discharged from said pump means, said regulator means including an electrically-operated member for varying the pressure of said highly pressurized fuel in accordance with a first electrical signal applied thereto;
   electrically-operated injector means for injecting said highly pressurized fuel regulated by said regulator means into said diesel engine in accordance with a second electrical signal applied thereto; and
   control means for controlling said electrically-operated member and said injector means, said control means producing said first electrical signal in accordance with the rotational speed sensed by said second sensing means so that the pressure of said highly pressurized fuel discharged from said pump means regulated to a higher pressure as the sensed rotational speed is increased, and said control means producing said second electrical signal in accordance with the rotational speed sensed by said second sensing means and the accelerator position sensed by said first sensing means so that a timing and interval of a fuel injection by said injector means are varied in accordance with the sensed rotational speed and the sensed accelerator position.

2. A fuel supply device for an internal combustion engine comprising:
   a fuel tank for reserving fuel;
   a high pressure pump for pressurizing fuel sent from said fuel tank and discharging the highly pressurized fuel;
   a regulator having a high pressure chamber for holding the highly pressurized fuel discharged from said high pressure pump to maintain the fuel at a set pressure,
   wherein said regulator comprises;
   (a) a housing having a large diameter bore and a small diameter bore,
   (b) a piston having a large diameter portion located in said large diameter bore and a small diameter portion slidably supported in said small diameter bore to form said high pressure chamber therein, and
   (c) a diaphragm connected to said large diameter portion in define a control chamber and a low pressure chamber in said large diameter bore, said control chamber being located at the opposite end of said piston to said high pressure chamber,
   said piston displacing in accordance with an air pressure fed to said control chamber to vary pressure in said high pressure chamber to a set pressure;
   means for controlling a fuel pressure in said high pressure chamber, said controlling means varying the fuel pressure according to an engine condition; and
   a fuel injector injecting the highly pressurized fuel maintained at the set pressure by said regulator to the internal combustion engine.

3. A fuel supply device for an internal combustion engine comprising:
   a fuel tank for reserving fuel;
   a high pressure pump for pressurizing fuel sent from said fuel tank and discharging the highly pressurized fuel;
   a regulator having a high pressure chamber for holding the highly pressurized fuel discharged from said high pressure pump to maintain the fuel at a set pressure, wherein said regulator comprises:
   (a) a housing having a large diameter bore and a small diamter bore,
   (b) a piston slidably supported in said small diameter bore to form said high pressure chamber, and
   (c) a plate member slidably supported in said large diameter bore to define a control chamber and a low pressure chamber therein, said control chamber being located at the opposite end of said piston to said high pressure chamber, said plate member being in contact with said piston and being displaced according to a fuel pressure fed to said control chamber to vary pressure in said high pressure to a set pressure;

means for controlling a fuel pressure in said high pressure chamber, said controlling means varying the fuel pressure according to an engine condition; and a fuel injector injecting the highly pressurized fuel maintained at the set pressure by said regulator to the internal combustion engine.

4. A fuel supply device according to claim 2, wherein said high pressure pump comprises:

a housing having a cylinder bore, an inlet port thereof communicating with said fuel tank, and an outlet port thereof communicating with said high pressure chamber, a plunger slidably supported in said cylinder bore to form a pump chamber therein which communicates with said outlet port, said pump chamber being contracted and expanded by reciprocation of said plunger, said plunger having a release groove on a surface thereof and a passage connecting said release groove to said pump chamber, said release groove inclining to the axis of said plunger and communicating with said inlet port according to a stroke of said plunger, means for rotating said plunger about the axis thereof, means for reciprocating said plunger along the axis thereof, the stroke in which said release groove communicates with said inlet port varying according to a rotational position of said plunger so that a quantity discharged by said high pressure pump is varied.

5. A fuel supply device according to claim 4, wherein said rotating means has a pinion provided on said plunger, a rack meshing with said pinion, and means for moving said rack to rotate said pinion to rotate said plunger.

6. A fuel supply device according to claim 2, wherein said small diameter portion is formed with a passage, one end of which is open to said high pressure chamber, and the other end of which is open to said low pressure chamber in a state in which said piston is moved toward said control chamber to a certain stroke extent.

7. A fuel supply device according to claim 2, wherein said controlling means controls air pressure in said control chamber according to an engine condition.

8. A fuel supply device according to claim 2, wherein said controlling means raises the air pressure in said control chamber upon engine startup, and reduces the air pressure in said control chamber upon engine stop.

9. A fuel supply device according to claim 3, wherein said piston is formed with a passage, one end of which is open to said high pressure chamber, and the other end of which is open to said low pressure chamber in a state in which said piston is moved toward said control chamber to a certain stroke extent.

10. A fuel supply device according to claim 3, wherein said controlling means controls fuel pressure in said control chamber according to an engine condition.

11. A fuel supply device according to claim 3, wherein said controlling means raises the fuel pressure in said control chamber upon engine startup, and reduces the fuel pressure in said control chamber upon engine stop.

12. A fuel supply device according to claims 2 or 3, wherein said controlling means comprises:

a pressure source, a valve opening or closing a passage connecting said pressure source to said control chamber of said regulator, said passage communicating with a low pressure side when opened so that pressure in said passage is reduced, and means for urging said valve in the direction in which said valve closes said passage, a force of said urging means being controlled according to an engine condition.

13. A fuel supply device according to claim 12, wherein said urging means has a spring biasing said valve, a retainer engaging with said spring, and a motor having an output shaft threadingly fitted in said retainer, said retainer displacing in response to rotation of said output shaft so that the force of said spring is varied.

* * * * *